May 31, 1938. L. M. PAYNE 2,119,140
AUTOMOBILE BODY HEATER STRUCTURE
Filed Aug. 26, 1937 3 Sheets-Sheet 1
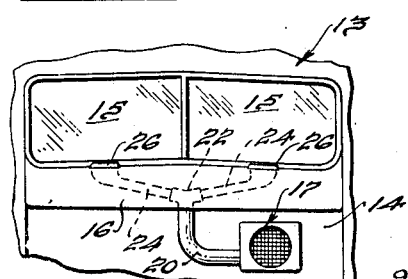
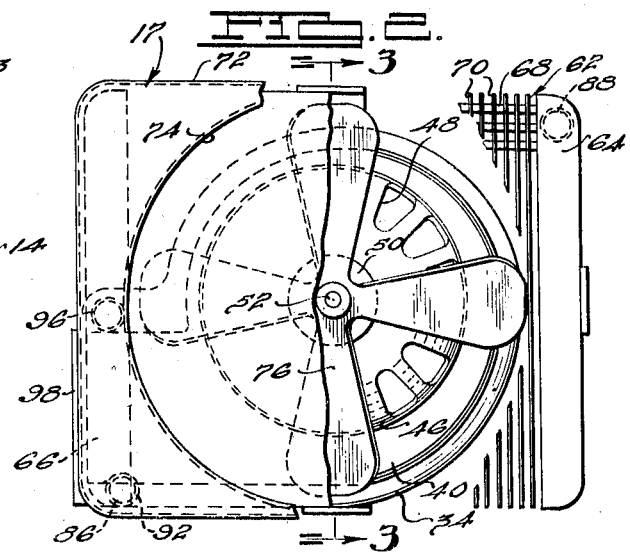
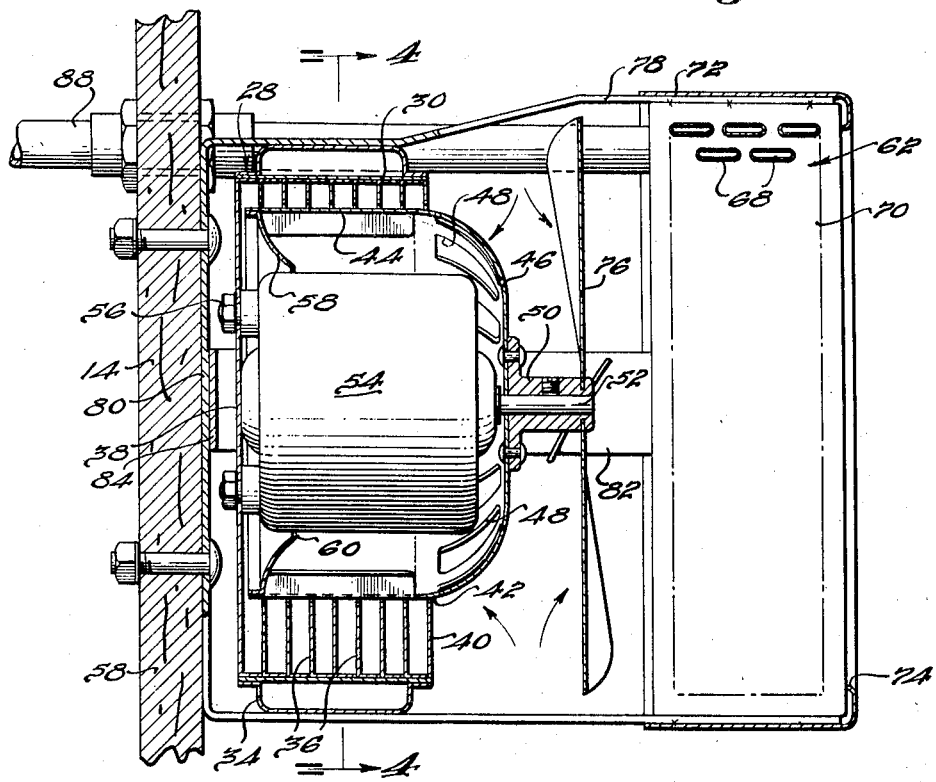
INVENTOR
Lambert M. Payne.
BY
Harness, Dickey & Pierce
ATTORNEYS.

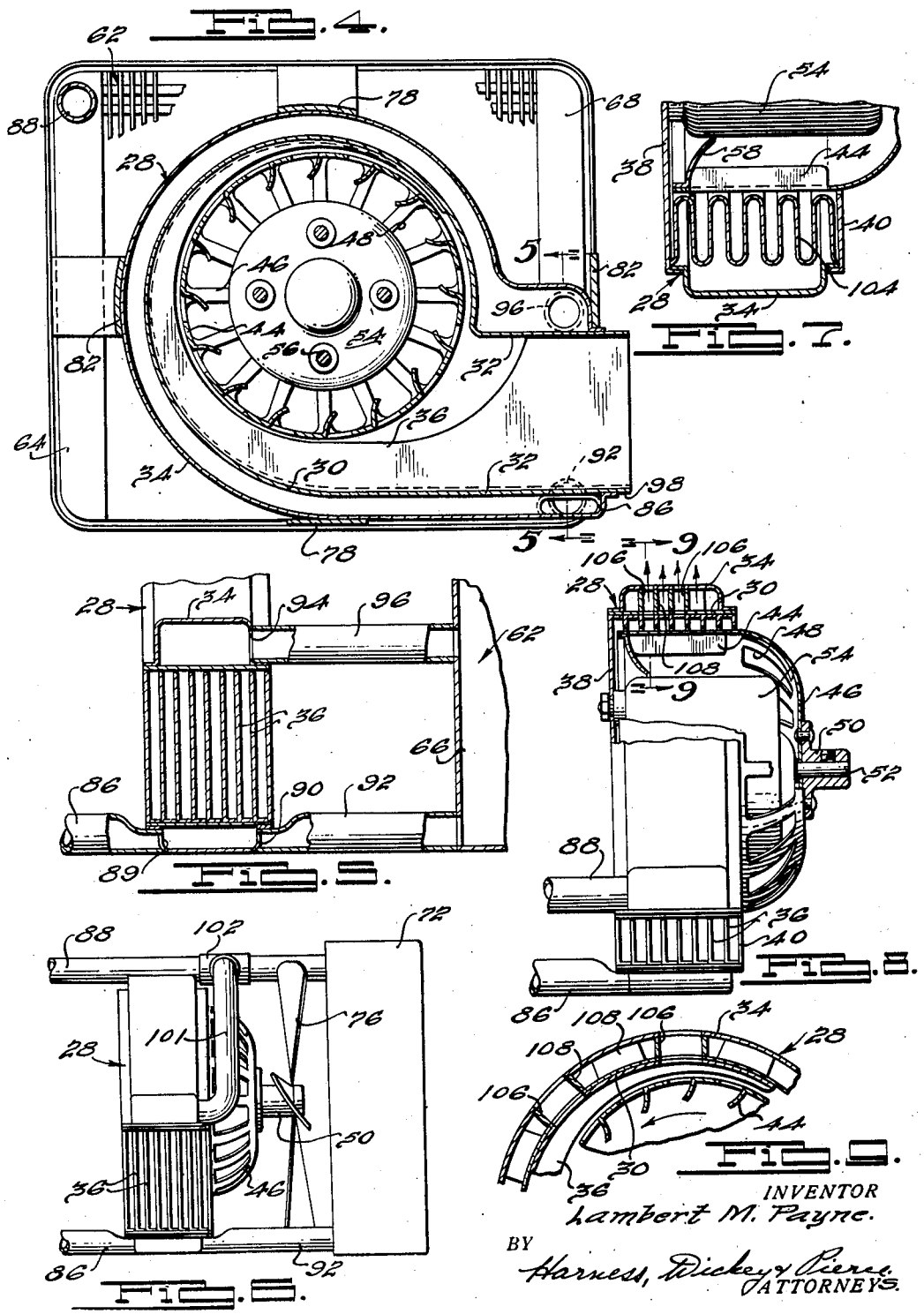

May 31, 1938. L. M. PAYNE 2,119,140
AUTOMOBILE BODY HEATER STRUCTURE
Filed Aug. 26, 1937 3 Sheets-Sheet 3
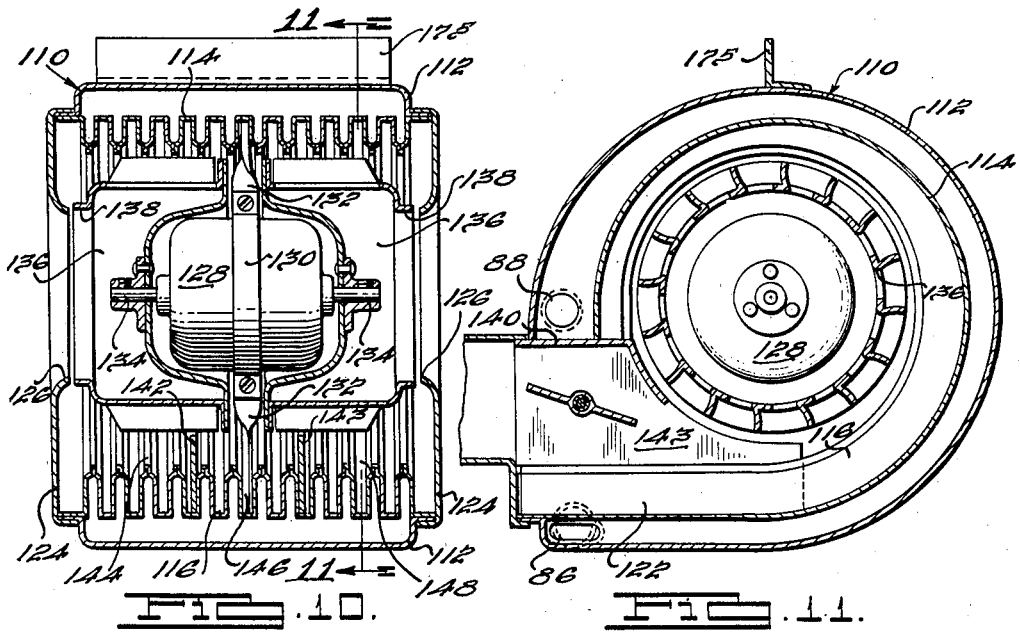
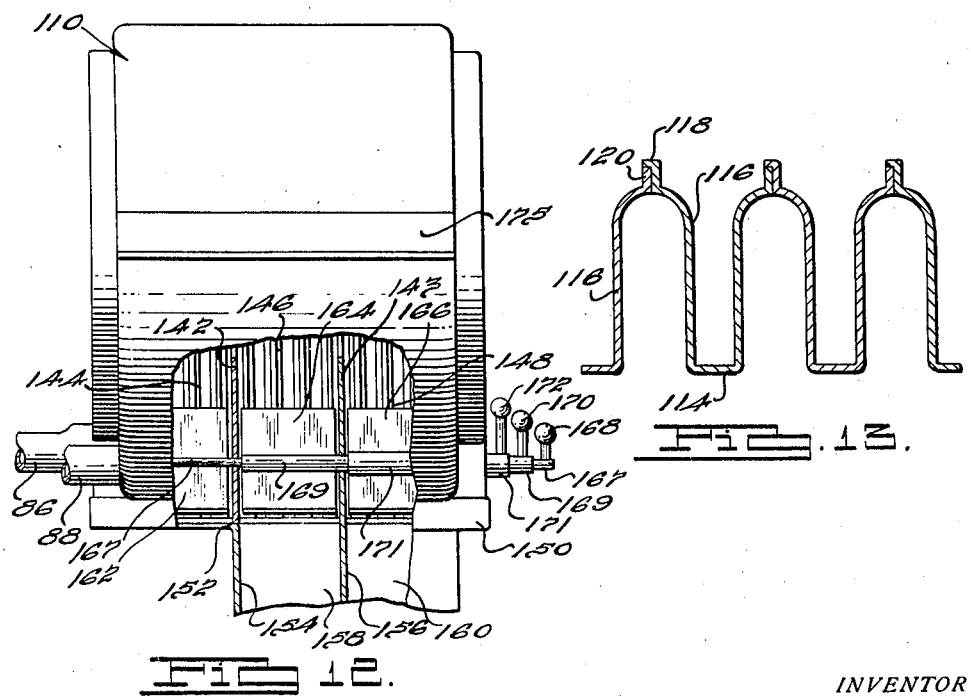
INVENTOR
Lambert M. Payne.
BY
Harness, Dickey & Pierce.
ATTORNEYS.

Patented May 31, 1938

2,119,140

UNITED STATES PATENT OFFICE 2,119,140

AUTOMOBILE BODY HEATER STRUCTURE

Lambert M. Payne, Detroit, Mich.

Application August 26, 1937, Serial No. 161,004

2 Claims. (Cl. 257—137)

This invention relates to heater structures, and particularly to heater structures adapted for use in automobile bodies.

Objects of the invention are to provide a simplified and compact heater structure which takes up a minimum of room within the passenger compartment of an automobile; to provide a heater structure of the type employing a centrifugal fan in which the heat exchanger member also forms an air confining conduit and a housing around a centrifugal fan; to provide a simplified heater structure in which an annular heat exchange member is provided having a centrifugal fan mounted therein and in which a plurality of separate discharge conduits are provided for discharging air in one direction; to provide a simplified heater structure in which the heated air may be discharged therefrom for proper distribution within the passenger compartment of the automobile; to provide a heater structure by which heated air may be discharged directly into the passenger compartment of the vehicle and discharged against the inner face of the vehicle windshield, in which two heat exchange elements are provided, one of the heat exchange elements being a conventional core for heating the air discharged directly into the passenger compartment and the other heat exchange member being mounted in surrounding relation to a centrifugal fan from which the heated air is directed against the inner face of the windshield; and to provide a heater structure which is economical to manufacture and efficient in use.

Other objects of the invention will become apparent from the following specification, the drawings relating thereto, and from the claims hereinafter set forth.

In the drawings in which like numerals are used to designate like parts in the several views throughout:

Fig. 1 is a fragmentary elevational view of the interior of a vehicle having associated therewith a heating unit embodying features of the present invention;

Fig. 2 is an enlarged front elevational view, with parts broken away, of the heater illustrated in Fig. 1 and embodying features of the present invention;

Fig. 3 is an enlarged cross sectional view, with parts in elevation, taken substantially along the line 3—3 of Fig. 2;

Fig. 4 is a cross sectional view, with parts in elevation, taken substantially along the line 4—4 of Fig. 3;

Fig. 5 is a fragmentary cross sectional view, with parts in elevation, taken substantially along the line 5—5 of Fig. 4;

Fig. 6 is a side elevational view of a structure similar to that illustrated in Figs. 2 to 5 illustrating a modified manner of supplying the heat exchange medium to the heat exchange elements;

Fig. 7 is a fragmentary cross sectional view illustrating a modified structure embodying features of the present invention;

Fig. 8 is a side elevational view of a modified form of heater, with parts broken away, illustrating parts in cross section, embodying features of the present invention;

Fig. 9 is a fragmentary cross sectional view taken substantially along the line 9—9 of Fig. 8;

Fig. 10 is a vertical cross sectional view of another preferred form of heater embodying features of the present invention;

Fig. 11 is a cross sectional view taken substantially along the line 11—11 of Fig. 10;

Fig. 12 is a top plan view of the heater illustrated in Figs. 10 and 11 with parts broken away showing parts in cross section;

Fig. 13 is an enlarged fragmentary cross sectional view illustrating certain details of the structure illustrated in Fig. 10.

In an automobile body heater of the type including a radiator, or core, heated by steam or hot water and having a motor driven fan which circulates the air in the body through the core for the purpose of heating the air, it has become increasingly popular in recent years to provide means for directing a portion of the air heated from the radiator against the rear face of the automobile windshield, independently of the main stream of air issuing from the heater. Such separate stream of air is directed against the inner face of the windshield in order to remove any condensed moisture in the form of fog or the like which tends to collect on the same, and to melt any snow or ice on the exterior of the windshield which otherwise might tend to interfere with the vision of the driver.

According to the present invention a plurality of streams of air are discharged from a heater, one of the streams being conducted to a position behind and adjacent the bottom edge of the windshield for discharge thereagainst and the remaining air being discharged into the passenger compartment. The present invention provides a compact and simplified structure by which the air may be efficiently heated and effectively discharged from the heater for diffusion within the passenger compartment.

The present invention also provides a novel heat exchange element associated with a centrifugal fan in which the heat exchange element itself forms a housing for the centrifugal fan and therefore forms an air confining conduit for the air drawn into and through the heater. The centrifugal fan is so arranged relative to the heat exchange element that the air discharged from the centrifugal fan is in intimate heat exchange relation with the heat exchanger and is discharged from the heater in a properly heated condition.

Referring to the accompanying drawings in Fig. 1 an automobile 13 is illustrated having a dashboard 14, a windshield 15, shown as of the divided type, and an instrument panel 16. A heater assembly is shown generally at 17, it being understood that it is supported from the dashboard 14. A main body of air is discharged from the heater directly into the passenger compartment, and an auxiliary stream of air from the heater 17 is shown by way of illustration as being discharged through a tube 20 to a Y connection 22 from which the branches 24 lead to nozzle-like discharge members 26 which project through openings therefor in the upper edges of the instrument panel 16 in positions to direct the heated air therefrom against the inner face of the windshield 15 on the opposite sides of the center thereof.

Referring particularly to Figs. 2 to 5, one embodiment of the present invention is illustrated in which the heater 17 includes a substantially scroll shaped heat exchange element generally indicated at 28. The heat exchange element 28 includes an inner substantially scroll shaped member 30 having tangential substantially straight portions 32 forming an air outlet conduit. The heat exchange element 28 also includes an outer wall member 34, having side portions, which is complementary in shape to the wall member 30 and embraces the wall member 30 and is secured thereto to form a confining chamber for a heat exchange medium between the walls. Radially directed, substantially annular heat radiating fin members 36 are mounted to the inner surface of the wall member 30 and have angle portions which are secured to the inner surface of the wall member 30 in intimate heat exchange relation therewith. The fin members 36 are transversely spaced across the inner face of the heat exchange element 28 and are of progressively increasing depth around their length toward the discharge opening of the heat exchanger. The fins 36 are preferably increased to a depth substantially equal to the depth of the air discharge conduit formed by the straight members 32.

The rear face of the heat exchange element 28 is closed by a plate member 38 having a shape corresponding to the cross sectional shape of the heat exchange element 28. A plate member 40 of a shape substantially the same as the shape of the fin members 36 is mounted over the front face of the heat exchange element 28 so as to provide an air inlet opening 42 in the forward face.

A centrifugal fan 44, preferably of the Sirocco type, is mounted within the heat exchange member 28 in the space defined by the inner edges of the fin members 36. The centrifugal fan 44 is provided with a web portion 46 having a plurality of air inlet openings 48 formed therethrough, the web portion 46 extending through the opening 42. The centrifugal fan is mounted by the web portion 46 to a hub member 50 which is secured to the front face of the web portion 46 at the center thereof and secured to a shaft 52 of a motor 54 for rotation with the motor shaft. The motor 54 is also mounted within the centrifugal fan 44 and within the heat exchange element 28 and is suitably secured in position by means of bolts and nuts 56 to the plate member 38. In order to assist in confining the air discharged by the centrifugal fan, an inwardly directed air confining member 58 which is substantially circular in shape is secured to the rear edge of the centrifugal fan 44 for rotation therewith, and has an opening 60 therethrough which is in surrounding relation to the motor 54 so that the edge of the opening extends to a position closely adjacent the outer peripheral surface of the motor 54.

Another heat exchange element in the form of an upstanding heat exchange core 62 is positioned forwardly of the heat exchange member 28 in spaced relation thereto. The heat exchange element 62 may be of any of the conventional types, and in the embodiment illustrated is substantially rectangular in shape and is of the tube and fin type having upstanding side headers 64 and 66 connected by tubes 68. Spaced fin members 70 have openings therethrough through which the tubular members 68 extend in intimate heat exchange relation.

The core 62 is preferably mounted within a heater casing member 72 having an air discharge opening 74 in the front face thereof.

In order to force air through the heating core 62 and discharge the heated air through the discharge opening 74, a propeller fan 76 is mounted to the hub member 50 for rotation with the motor shaft 52 in the space between the heat exchange element 28 and the heat exchange core 62.

In order to mount the heater assembly to the dashboard 14, a substantially U-shaped strap member 78 is secured to the casing member 72 to support the heating core 62. The heat exchange element 28 with the motor 54 and the fans 44 and 76 are also supported by the strap member 78 adjacent the base or rear thereof. The strap member 78 has a base portion 80 which may be suitably secured to the dashboard 14. Another substantially U-shaped strap member 82 is horizontally disposed at right angles to the strap member 78 and is also secured to the casing member 72 and the heat exchange element 28. The strap member 82 has a base portion 84 which may be suitably secured to the inner face of the base portion 80 of the strap member 78.

In order to supply a heat exchange medium to the heat exchange element 28 and core 62 from the engine cooling system of the automobile, an inlet tube 86 and an outlet tube 88 extend through the dashboard 14 and are suitably connected to the engine cooling system in the usual way. The inlet tube 86 communicates through an opening 89 with the confining chamber of the heat exchange element 28; and another opening 90 aligned with the opening 89 is provided through one of the walls of the heat exchange element 28 and communicates with the header 66 of the heating core 62 through a short tubular member 92. The heat exchange element 28 is also provided with an outlet opening 94 which is also placed in communication with the header member 66 through an opening therein by a short tubular member 96.

The heating medium thus circulates from the engine cooling system by being introduced through the inlet tube 86 to the heat exchange element 28. A portion of this heating medium passes directly across the chamber of the heat exchange element through the opening 90 and through the tubular member 92 to the header 66. Another portion of the heating medium passes around the annular confining chamber formed by the heat exchange member 28 and is discharged therefrom through the opening 94 and through the tubular member 96 to the header member 66. The heat exchange medium passes from the header member 66 through the tubular member 68 to the header member 64 and is discharged therefrom by the return tube 88 which is in communication with the header member 64.

In the operation of the heater so far described, air is drawn into the heater in the space between the heat exchange element 28 and the heating core 62, and a portion of this air is forced forwardly by the propeller fan 76 into and through the core 62 and is discharged therefrom through the opening 74 directly into the passenger compartment of the vehicle. A portion of the air is also drawn into the centrifugal fan 44 through the inlet openings 48 and is discharged therefrom against the annular conduit formed by the heat exchange element 28 and heated thereby. The air heated by the heat exchange element 28 is confined in its passage around the heat exchange element 28 and is discharged therefrom through the discharge conduit formed by the substantially straight portions 32 of the inner wall member 30.

The portions 32 extend slightly outwardly beyond the sides of the heater as indicated at 98 and form a fitting to which the conduit member 20 may be attached. The heated air discharged by the centrifugal fan 44 is thus directed through the conduit 20 to a position adjacent the inner face of the windshield 15 for direction thereagainst.

In the modified embodiment illustrated in Fig. 6, instead of passing the heat exchange medium that has been circulated through the heat exchange member 28 to the heating core 62 for circulation therethrough, a structure is provided by which the heating medium circulated through the heat exchange member 28 may be returned directly to the return tube 88 without passage through the heating core 62. In the structure illustrated in Fig. 6, a tubular conduit member 101 communicates through the discharge opening 94 with the confining chamber of the heat exchange element; and the tubular member 101 discharges through a T connection 102 into the return tube 88. The heat exchange medium in the structure illustrated in Fig. 6 thus enters through the inlet tube 86 into the confining chamber of the heat exchange element 28. A portion of the heat exchange medium passes directly through the conduit member 92 to the core 62 for passage therethrough and is returned from the core 62 through the return tube 88 as described above in the embodiment illustrated in Figs. 2 to 5. A portion of the heat exchange medium discharged from the inlet tube 86 is passed around the annular confining chamber of the heat exchange element 28 and is discharged therefrom through the conduit member 101 to the return tube 88.

In the modified structure illustrated in Fig. 7, a heating core 28 is provided of substantially the same general shape as that described above, but instead of using an inner wall 30 and heat exchange fins 36, a member which serves the combined functions of the inner wall and fins is provided. A heat exchange element 104 which forms the inner wall of the member 28 is provided which has a transverse sectional shape of a bellows and has a longitudinal sectional shape substantially the same as one of the heat exchange elements 36, as indicated in Fig. 4. The element 104 is secured to the side edges of the wall member 34 and is sealed thereto so that a confining chamber for the heat exchange medium is provided between the wall member 34 and the element 104. Plate members (not shown) complementary in shape to the transverse cross-sectional shapes of the confining chamber at the air discharge conduit may be fixed over the ends of the confining chamber adjacent the air discharge opening of the heater.

In another modified embodiment of the present invention illustrated in Figs. 8 and 9, the heating core 62 and the propeller fan 76 are dispensed with and the heat exchange element 28 is constructed for direct discharge of heated air into the passenger compartment as well as discharge of heated air through a conduit member 20 against the windshield. A plurality of air discharge openings 106 are provided through the heat exchange element 28 communicating with the space within the heat exchange element and with the interior of the passenger compartment for discharge of heated air directly into the passenger compartment. The openings 106 are provided in staggered relation to each other around the periphery of the heat exchange element 28 so that a continuous passage for the flow of heat exchange medium through the confining chamber of the heat exchange element 28 is provided. To provide such openings 106, openings are provided through the inner wall member 30 and the outer wall member 34 of the heat exchange element 28, which openings may be connected by short tubular members 108 so that the air may be discharged through the openings 106 and the heat exchange medium sealed and confined within the confining chamber of the heat exchange member 28.

Air is drawn into the heater through the openings 48 and discharged by the centrifugal fan against the fin members 36 and the inner wall member 30. A portion of the air discharged by the heated fan passes directly into the passenger compartment through the openings 106, and a portion of the heated air is discharged through the discharge conduit formed by the portion 32 for discharge against the windshield as described above.

Another preferred modified form of the present invention illustrated in Figs. 10 to 13, a heater is provided in which the heat exchange element is generally of the same shape and construction as the heat exchange element 28 previously described. The heat exchange member 110 has an outer wall portion 112, which is similar in shape to the wall portion 34 described above. An inner wall member 114 is provided in spaced relation to the wall member 112 and forms with the wall member 112 a confining chamber for the heat exchange medium.

The wall member 114 is formed of a plurality of annular segments 116 having radially directed side walls with one of the edges of the segments 116 flanged as at 118 to cooperate with a complementary portion 120 on the adjacent segment 116 so that the segments 116 may be assembled and secured together, as indicated in 113, to form the confining wall 114. The confining wall thus formed is so shaped that the segments 116 also form heat radiating fins so that the heat exchange efficiency of the heat exchange member 110 is increased in a simplified manner. The radially extending walls of the segments 116 preferably increase in depth around the heat exchange member 110 toward the discharge opening of the heat exchange member and are substantially annular in shape for the major portion of their lengths but are substantially straight as indicated at 122 to form one wall of the discharge conduit for the heater.

The heat exchange medium is supplied through an inlet pipe 86 to the confining chamber formed between the wall members 112 and 114 and circulates therearound for discharge through the return tube 88.

End members 124 having air inlet openings 126 therethrough are mounted over the ends of the heat exchange element 110 for confining the air within the confines of the heat exchange member.

A motor 128 is mounted within the interior of the heat exchange member 110 and may be suitably secured in place by means of a strap 130 attached to supporting strap members 132 which may be suitably secured to the inner wall 116 for mounting and positioning the motor 128. The motor 128 is provided with a drive shaft 134 which extends outwardly therebeyond in opposite directions and oppositely disposed centrifugal fans 136 are suitably secured to the opposite ends of the motor shaft 134 for rotation therewith.

The centrifugal fans 136 are provided with inlet openings 138 and are so positioned that the inlet openings 138 are aligned with the inlet openings 126 of the end members 124.

Air is drawn into the heater through the openings 126 and is discharged by the centrifugal fans 136 into intimate heat exchange relation with the heat exchange member 110. The heated air is conducted around the annular portion of the heat exchange member 110 and is discharged therefrom through a tangentially disposed discharge conduit defined by the end members 124, the horizontal portion 122, and an inwardly directed plate member 140 which forms an end wall of the heat exchange member 110 and defines the upper confining wall of the air discharge conduit.

All of the air discharged from the heater is discharged in a single direction through the discharge conduit, and in order to provide for proper distribution of the heated air within the passenger compartment, the discharge conduit is divided into a plurality of separate discharge conduits by transversely spaced elongated plate members 142 and 143 which are disposed longitudinally within the discharge conduit. In the embodiment illustrated, the plate members 142 and 143 divide the discharge conduit into three separate conduits, namely, 144, 146 and 148.

In order to distribute the air discharged from the heater within the passenger compartment, from the conduits 144, 146 and 148, a cover member 150 is suitably secured to the heat exchange member 110 over the air discharge conduits 144, 146 and 148. The cover member 150 has an opening 152 therethrough which communicates directly with the conduit 144 and communicates directly with the interior of the front passenger compartment so that the air discharged from the conduit 144 is directly discharged into the front passenger compartment. The remaining portion of the cover member 150 is provided with elongated wall portions 154 and 156 which provide two separate conduits 158 and 160. The conduit 158 communicates with the discharge conduit 146 and may be suitably secured to the conduit member 20, as illustrated in Fig. 1, for discharge of the heated air discharged through the conduit 146 to a position adjacent the inner face of the windshield. The conduit 160 is in communication with the discharge conduit 148 and a conduit member (not shown) may be suitably connected to the conduit 160 and extend to the rear of the passenger vehicle so that the heated air discharged from the discharge conduit 148 may be carried to the rear of the passenger compartment and discharged directly therein.

In order to independently control the flow of heated air through the discharge conduits 144, 146 and 148, shutter members 162, 164 and 166 are pivotally mounted within these respective conduits. The shutter member 162 is secured to a transversely extending elongated pivot shaft 167 which may be pivotally mounted in the end members 124 and extends outwardly beyond one side thereof. An operating handle 168 may be suitably secured to the shaft 167 for operation of the shutter 162. A tubular shaft 169 is rotatably received over the shaft 167 for independent rotation thereto and also extends outwardly beyond one side of the heater and has an operating handle 170 therefor. Another tubular shaft 171 has secured thereto the shutter member 166 and is rotatably received over the tubular shaft 169 for independent relative rotation thereto and also extends outwardly beyond one side of the heater and has fixed thereto an operating handle member 172.

From the above, it is evident that a simplified heater structure is provided in which the heated air is discharged in a single direction in a plurality of separate streams and in which the separate streams of heated air may be properly distributed within the vehicle for efficient heating.

The heater assembly illustrated in Figs. 10 to 13 may be suitably mounted within the passenger compartment of a vehicle in any desired manner. For this purpose, a transversely extending angle member 175 is secured to the heat exchange element 110; and the angle member 175 may be suitably attached to a supporting wall on the vehicle.

Formal changes may be made in the specific embodiments of the invention described without departing from the spirit and substance of the invention, the scope of which is commensurate with the appended claims.

What is claimed is:

1. An automobile body heater comprising a scroll shaped heat exchange member forming an air confining conduit in the interior thereof, said member having spaced inner and outer walls forming a confining chamber for a heat exchange medium, means communicating said confining chamber with the engine cooling system of said automobile, said member having an inlet opening in one side thereof and being shaped to form a tangentially disposed outlet conduit, fin members disposed within said heat exchange member and fixed to the inner wall thereof, said fin members being of progressively increasing depth therearound toward the discharge conduit, a centrifugal fan disposed within the confines of said member, and means for driving said fan.

2. An automobile body heater comprising an upstanding heating core, a scroll shaped heat exchange member mounted in spaced relation from said core, said annular member forming an air confining conduit in the interior thereof, said annular member having spaced walls forming a confining chamber for a heat exchange medium, means communicating said confining chamber and said core with the engine cooling system of said automobile, said annular member having an air inlet opening in one side thereof and being shaped to form a tangentially disposed outlet conduit, a centrifugal fan disposed within the confines of said annular member, a propeller fan mounted between said annular member and said core for forcing air through said core, and means for driving said fans.

LAMBERT M. PAYNE.